United States Patent [19]

Forster

[11] 3,921,740

[45] Nov. 25, 1975

[54] SELF-PROPELLED VEHICLE

[75] Inventor: Larry G. Forster, Shoshoni, Wyo.

[73] Assignee: Chair-E-Yacht, Inc., Shoshoni, Wyo.

[22] Filed: June 12, 1974

[21] Appl. No.: 478,677

[52] U.S. Cl. ........... 180/26 R; 180/DIG. 3; 188/119

[51] Int. Cl.[2] ........................................ B62D 61/08

[58] Field of Search .......... 180/26 R, 26 A, DIG. 3; 280/DIG. 10; 188/119; 214/85, 334

[56] References Cited

UNITED STATES PATENTS

| | | | |
|---|---|---|---|
| 2,779,425 | 1/1957 | Miller | 180/26 R |
| 2,856,019 | 10/1958 | Steibel | 180/26 R |
| 3,190,386 | 6/1965 | Swinny | 180/26 R |
| 3,219,137 | 11/1965 | Appleton | 180/26 R |
| 3,572,455 | 3/1971 | Brueske | 180/26 A |

*Primary Examiner*—Philip Goodman
*Assistant Examiner*—John A. Carroll
*Attorney, Agent, or Firm*—Bernard L. Kleinke; Thomas W. Speckman; Leonard J. Kalinowski

[57] ABSTRACT

A self-propelled vehicle includes a vehicle body mounted on a frame and rollably supported by front and rear wheel assemblies, driving means, such as an engine, mounted on the frame for powering the vehicle, a mechanism for drivingly connecting the output of the drive means to at least one of the wheel assemblies, a mounting device for connecting rotatably the driven wheel assembly to the body to permit the driven wheel assembly to rotate freely about an axis in a 360 degree circle of rotation, and a manually operable steering control device rotatably mounted on the frame for rotating the driven wheel assembly about its axis in the 360 degree circle of rotation, whereby the vehicle may be driven in a reverse direction by simply turning the driven wheel assembly through 180 degrees and then applying the power to drive the vehicle in reverse. A ramp is hingedly mounted on the body to serve as a loading ramp when in its down position and to serve as a closure when disposed in its upper position, and a latching mechanism maintains the ramp in its upper position and serves as a wheel brake when the ramp is in its lower position. A flexible coupling is provided between the steering control device and the driven wheel assembly to enable the steering control device to extend upwardly and rearwardly to terminate in a convenient position for manipulation by the operator.

12 Claims, 9 Drawing Figures

105
49
26
47
186
28
174
10
170
184
52
31
178
189A
33A
188
176
33
37
182
181
189
56
16
25
21
64
18
39

63
49'
107
105
49
163
61
10
161
47
37
26
45
12
28
186
174
170
165
33
157
43

52
14D
184
176
14C
189A
31
178
188
189
33A
182
56
21
25
16
14
64
18
39

190
185
187
21
183
179
190A
172
14
14A
14B
26
28
54
175
31
177
63
16
63A
107
49
37
47
43
35
33
18
105
4
61
33A
186
174
14D
64
14C
182
178
31
176
10
14E
184
52
189
189A
25
170

105
167
49
47
163
161
5.
107
105
165
26
155
159
43
157
132
121
125
14D
14C
14
14A
14B
146
148
28
101
66
103
41
107
58
98
87
81
89
85
83
92
74
16
78
35
96
14
14
14E
94
64
18
5.

161
155
43
6.
157
132
121
125
14B
14D
14A
14C
146
148
105
66
107
6.
68
70
41
7.
58
116
98
117
119
112
120
118
87
92
89
7.
114
78
85
96
76
14
64
72
16
14E
18
94

107
105
159
155
43
151
157
132
127
134
121
125
14A
14C
123
146
129
148
142
144
140
138
107
136
105
66

58
119
109
109
107
112
81
116
117
119
120
108
118
114
115
109

217
198
201
205
203
222
211
194
191
196
208
215
218
192
207
216

196
194
208
192

203
207
215
201
198
226
222
218
219
218
231
191
233
224
213
228
209
211

SELF-PROPELLED VEHICLE

The present invention relates to a self-propelled vehicle, and it more particularly relates to a self-propelled vehicle which may be propelled by an internal combustion engine, an electric motor or the like for carrying an operator.

Small self-propelled vehicles have been employed for carrying handicapped persons seated in wheel chairs. As an example of such a vehicle, reference may be made to U.S. Pat. No. 3,204,791 to Williams. In the Williams patent, there is disclosed a self-propelled motor-driven vehicle, which includes a reversing motor for forward and reverse operations. Such reversing motor is undesirable in that it adds additional expense and weight and is inefficient in operation. Therefore, it would be highly desirable to have a new and improved self-propelled vehicle, which is efficient to operate and is readily controlled by an operator in such a manner that a handicapped person while seated in a wheel chair may conveniently operate the vehicle. Also, such a vehicle should not be required to have a reversing motor or a reverse gear power transmission and yet enable the operator to conveniently drive the vehicle in a reverse direction. Moreover, such a vehicle should have a steering control handle or wheel positioned in such a manner that the operator of the vehicle can conveniently manipulate it. Furthermore, such a vehicle should include a loading ramp which facilitates loading and unloading the vehicle and which has a latching mechanism which also serves as a wheel brake so that the operator can conveniently immobilize the vehicle while loading or unloading it. Also, such a vehicle should have a conveniently operated clutch and brake mechanism.

Therefore, the principal object of the present invention is to provide a new and improved self-propelled vehicle, which is convenient to operate and relatively inexpensive to manufacture.

Another object of the present invention is to provide such a new and improved self-propelled vehicle, which is enabled to be driven with a novel clutch and brake mechanism in a reverse direction without the necessity of providing a reverse gear transmission or a reversing motor, and which provides a loading and unloading ramp having a latching mechanism also serving as a wheel brake, the vehicle being provided with a steering control mechanism which is readily and conveniently accessible to the operator.

Briefly, the above and further objects are realized in accordance with the present invention by providing a self-propelled vehicle which includes driving means mounted on the frame of the vehicle for powering one of the front and rear wheel assemblies, a mounting device for connecting rotatably the driven one of the wheel assemblies to the body to permit the driven wheel assembly to rotate freely about an axis in a 360° circle of rotation, and manually operable steering control device rotatably mounted on the frame of the vehicle for rotating the driven wheel assembly about its axis in the 360° circle of rotation. As a result, there is no need for a reverse gear transmission or a reversing motor since the vehicle of the present invention is adapted such that the operator may conveniently turn the driven wheel assembly through 180° so that the vehicle may be propelled in a reverse direction. The vehicle also includes a flexible coupling connecting the steering control device with the driven wheel assembly so that the steering column of the steering control device may be inclined upwardly and rearwardly at an angle to the driven wheel assembly, whereby the handlebars for the steering column may be located conveniently within the reach of the operator who may be a handicapped person seated in a wheelchair supported by the vehicle. Also, the vehicle of the present invention includes a ramp hingedly connected at the rear end portion of the vehicle to move between a lower loading and unloading position and an upper closed position disposed over an opening in the body of the vehicle, and a braking and latching mechanism is provided to maintain releasably the ramp in its upper closed position and to brake the wheels of the driven wheel assembly when the ramp is in its lower position to facilitate the loading and unloading of the vehicle, whereby the operator who may be seated in a wheel chair can conveniently raise and lower the ramp to permit entrance and exit by the operator to and from the vehicle.

For other features and advantages of the present invention and for a more complete understanding of the objects and features of the invention, reference may be made to the following detailed description, taken in connection with the accompanying drawings, wherein.

Figure 1:
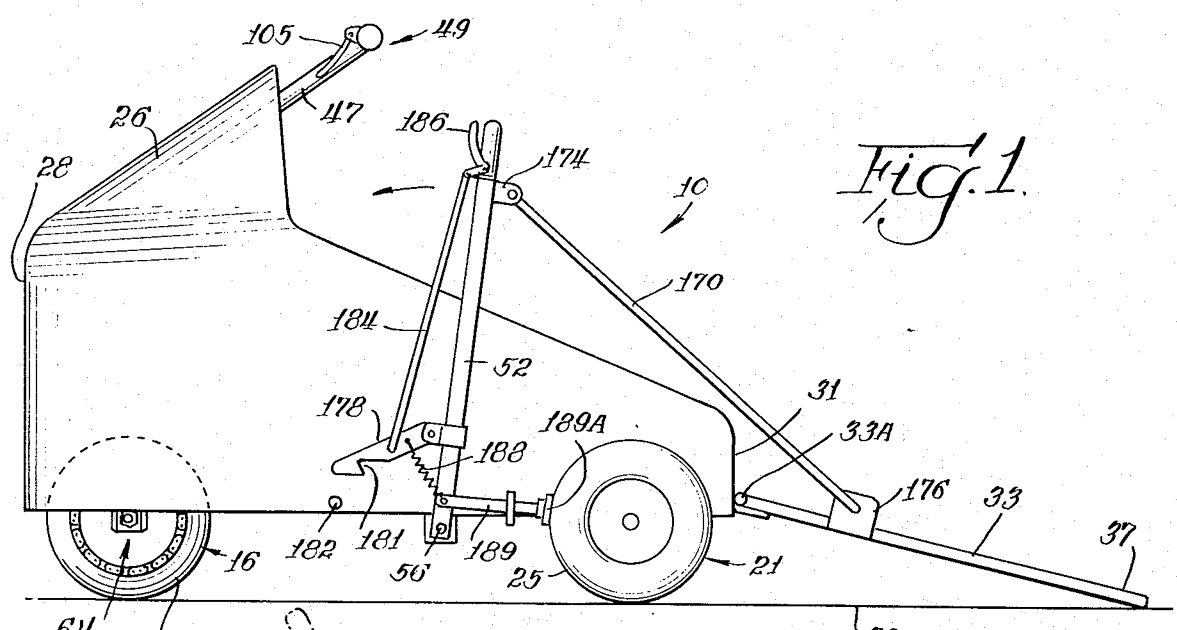
FIG. 1 is a side elevational view of a self-propelled vehicle constructed in accordance with the present invention, illustrating the vehicle with its ramp disposed in the lower loading and unloading position.
Figure 2:
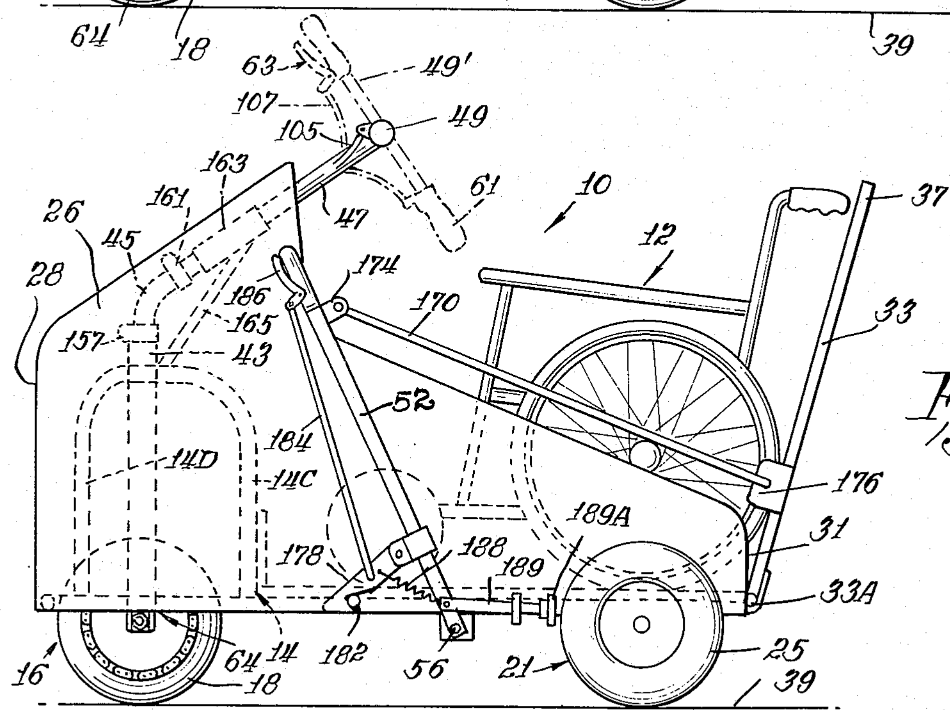
FIG. 2 is a side elevational view of the vehicle of FIG. 1, illustrating the ramp in its closed position with a wheel chair disposed within the body of the vehicle.
Figure 3:
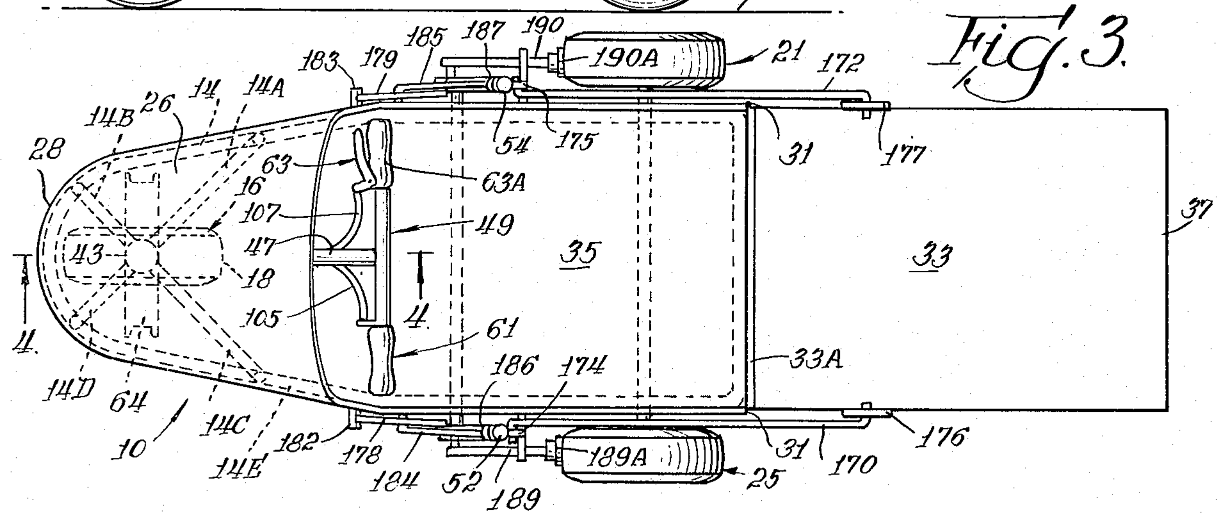
FIG. 3 is a plan view of the vehicle of FIG. 1.
Figure 4:
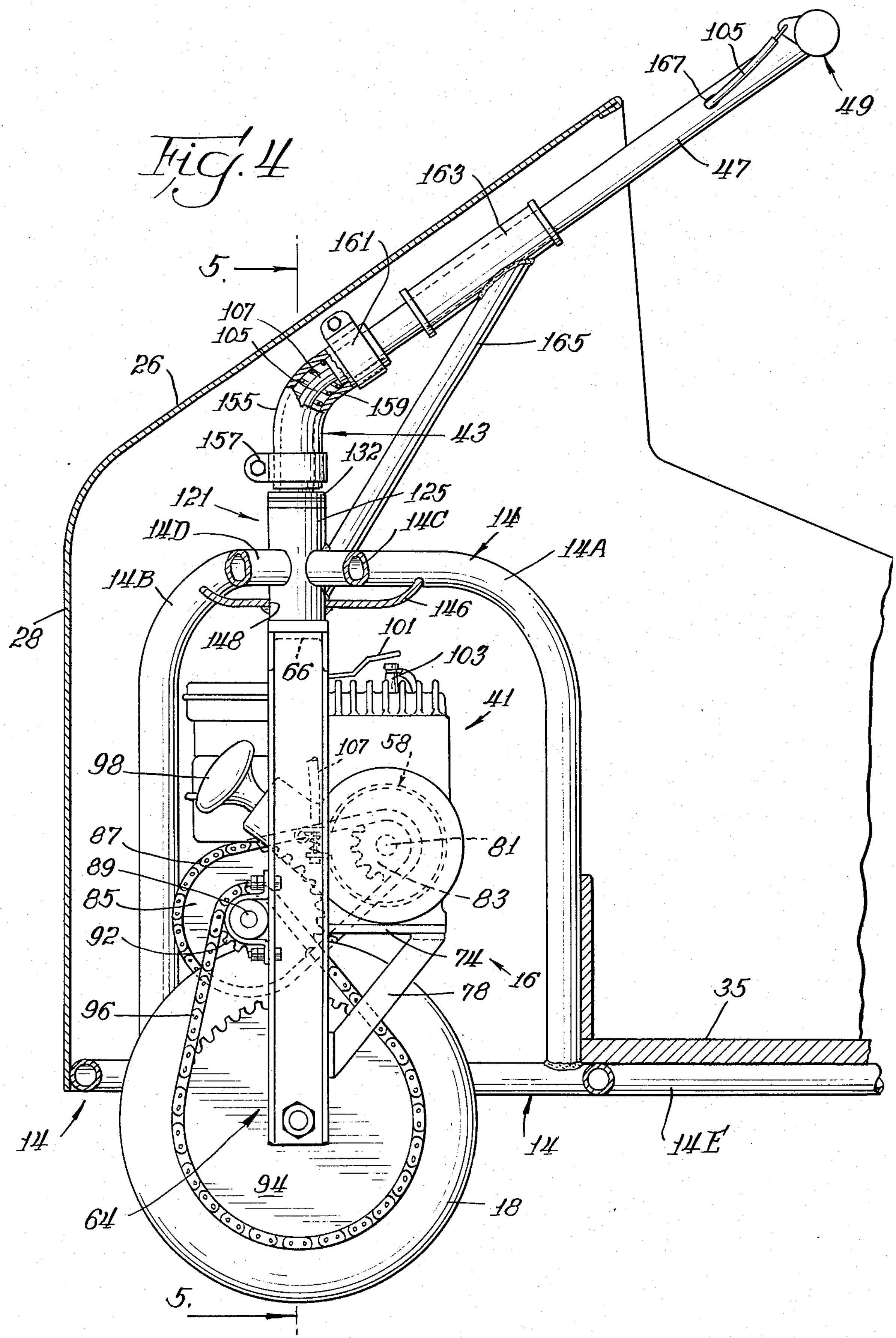
FIG. 4 is an enlarged fragmentary view of the vehicle of FIG. 3 taken substantially along the line 4—4 thereof.
Figure 5:
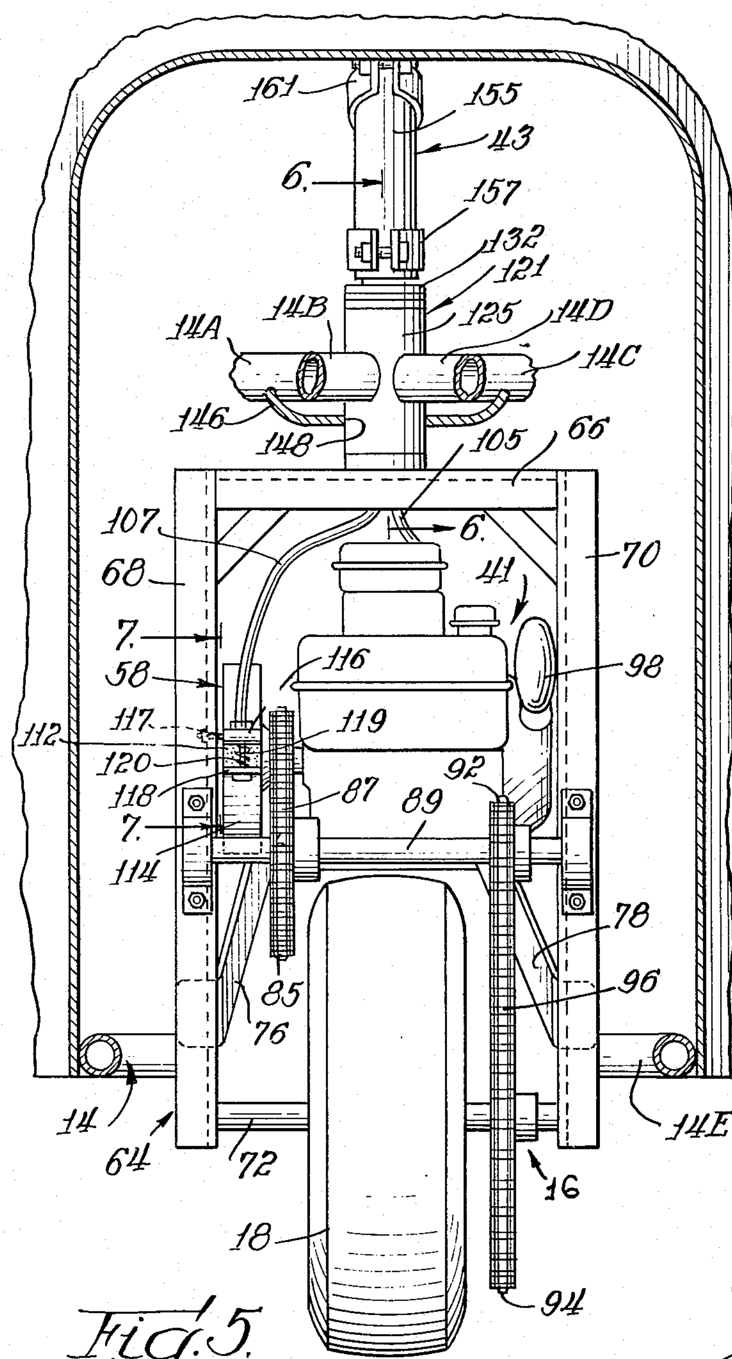
FIG. 5 is a cross-sectional view of the vehicle of FIG. 4 taken substantially along the line 5—5 thereof.
Figure 7:
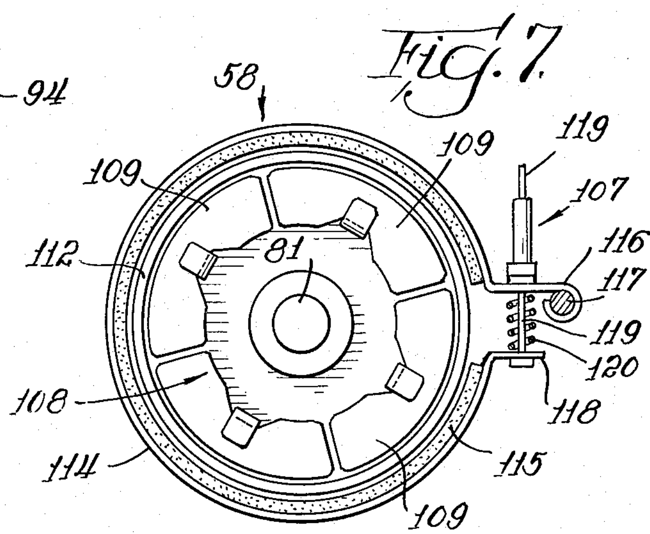
FIG. 7 is an enlarged face view of a brake and clutch unit of the vehicle shown in FIG. 5 taken along the lines 7—7 thereof.

Referring now to the drawings, and more particularly to FIGS. 1, 2 and 3 thereof, there is shown a self-propelled vehicle or cart 10, which is constructed in accordance with the present invention, and which is adapted to carry an operator who may be seated in a wheel chair 12. While the vehicle 10 is adapted to be used by a handicapped person seated in a wheel chair, it is to be understood that other persons may also use the vehicle of the present invention, and in this regard the vehicle 10 may be employed on golf courses for transporting golf players or the vehicle 10 may be used to transport a number of people about the grounds of an amusement park or zoo. The cart 10 generally comprises a vehicle frame generally indicated at 14, a front wheel assembly 16 having a single wheel 18 having traction-type tread, a rear wheel assembly 21 having a pair of rear wheels 23 and 25 each having rib-type tread, a chariot-shaped open vehicle body 26 mounted on the frame 14 with a contoured rounded front-end nose portion 28 and with an open rear portion 31 at which is hingedly connected at its lower end a ramp 33 movable between an upper position (FIG. 2) for serving as a door or closure to close the body portion 26 for retaining the wheel chair 12 resting on a floor 35 (FIG. 3) and a lower loading and unloading position as shown in FIG. 1 with its free end portion 37 resting on the supporting surface 39 for the vehicle 10 to enable the operator to gain access to and exit from the interior of the body portion 28 of the vehicle 10, a driving means in the form of an engine 41 as shown in FIG. 4 for driving the wheel 18 of the front wheel assembly 16 for powering the vehicle 10 along the supporting surface 39, a swivel connection 43 for rotatably mounting the front driven wheel assembly 16 to the frame 14 to permit the driven wheel assembly 16 to rotate about a vertical axis, and a flexible-coupling 45 (FIG. 2) for connecting the driven front wheel assembly 16 to a manually operable steering control column 47 inclined rearwardly and upwardly and terminating in a handlebar 49 disposed in a position conveniently accessible to an operator seated in the wheel chair 12, whereby the handlebar 49 may be turned in a complete circle by the operator seated in the wheel chair 12 as indicated by the broken lines 49' of FIG. 2 to rotate the steering column 47 axially to rotate the driven wheel assembly 16 about a vertical axis until the wheel 18 has moved through 180° so that the vehicle 10 may be moved in a reverse direction without the necessity of a reverse gear transmission or a reversing motor. A pair of manually operable levers 52 and 54 fixed at opposite ends to a transversely extending rod 56 journaled for rotation on the underside of the floor 35 of the vehicle body 28 extend upwardly therefrom to be controlled by the operator of the vehicle as hereinafter described in greater detail to enable the ramp 33 to be moved between its two positions, whereby the levers 52 and 54 may be operated to lower the ramp 33 from its position shown in FIG. 2 to its lower position as shown in FIG. 1 and to brake the rear wheels as hereinafter described in greater detail. As shown in FIGS. 5 and 7, a brake and clutch assembly 58 is used to control the speed and braking of the engine 41 in response to the respective hand controls 61 and 63, as best seen in FIG. 3, on the opposite ends of the handlebar 49.

Figure 6:
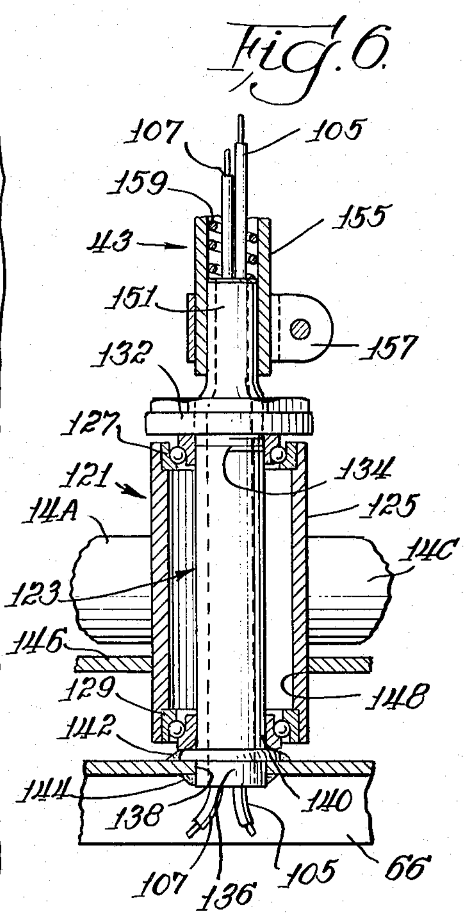
FIG. 6 is a cross-sectional view of the flexible-coupling and swivel connection of the vehicle of FIG. 5 taken substantially along the line 6—6 thereof.

Considering now the front driven wheel assembly 16 in greater detail with reference to FIGS. 4, 5 and 6 of the drawings, there is shown the driven wheel assembly 16, and in FIGS. 4 and 5 the assembly 16 is shown disposed in its reverse position to propell the vehicle 10 in a backward or reverse direction. The assembly 16 includes a fork 64 comprising a channel-shaped cross member 66 having a pair of downwardly depending channel-shaped legs 68 and 70 fixed to the opposite ends thereof, and an axle 72 journaled for rotation at its opposite ends to the distal end portions of the legs 68 and 70 for supporting rotatably the wheel 18. A platform 74 supported between the legs 68 and 70 carries the engine 41, and a pair of upwardly diverging braces 76 and 78 are connected to the underside of the platform 74 and are fixed to the legs 68 and 70 of the fork 64, the opposite end 40 of the platform 74 being supported by a bar (not shown) fixed to and extending between the legs 68 and 70 of the fork 64.

As shown in FIGS. 4 and 5 of the drawings, an output shaft 81 of the engine 41 has a sprocket 83 (FIG. 4) for driving a sprocket 85 via a chain 87, the sprocket 85 being fixed to a lower jack shaft 89 journaled for rotation at its opposite ends on the legs 68 and 70 of the fork 64. A sprocket 92 fixed at the opposite end portion of the shaft 89 drives a sprocket 94 fixed to the axle 72 for driving the wheel 18, the sprocket 94 being driven from the sprocket 92 via a chain 96.

In order to start the engine 41, a handle 98 may be grasped by the operator positioned within the body of the vehicle 10 when the assembly 16 is disposed in its forward direction (in a position 180° opposite the position shown in FIGS. 4 and 5 of the drawings), and pulled to start the engine 41 in a conventional manner. As shown in FIG. 4 of the drawings, a cantilevered metallic strip 101 is provided to short-circuit a spark plug 103 for stopping the engine 41. It is to be clearly understood that an electric motor or any other kind of motive means may be provided to power the vehicle 10, and the invention should not be limited to a vehicle having an internal combustion engine for powering it.

In order to control the braking and speed of the vehicle 10, a pair of conventional choke cables 105 and 107 extend between controls 61 and 63 (FIG. 3) to the engine 41, the control 61 being a rotatable handle for operating the throttle (not shown) of the engine and the control 63 comprising a fixed handle 63A and a hand-actuated lever 63B for controlling the assembly 68 via the cable 107.

As shown in FIG. 7, the assembly 58 is a centrifugal clutch, which engages when the engine 41 is running, and when the control 73 is actuated the clutch disengages and the output shaft 81 then is braked automatically. The assembly 58 includes a centrifugal clutch generally indicated at 108 having a series of weights 109 which surround the output shaft 81 and which move radially outwardly into engagement with the inside surface of a drum 112 fixed to the sprocket 83 for driving it during rotation of the output shaft 81, the clutch being purchasable from Cowboy Rentals, of Lander, Wyoming. In order to brake the engine 41, a brake band 114 having a brake lining 115 is moved into braking engagement with the outer surface of the drum 112 to slow it down, thus releasing the clutch. An outwardly bent radially-extending end portion 116 of the band 114 is fixed by means of a bolt 117 to the leg 68 of the fork 64, and the opposite outwardly-bent radially-extending end 118 of the band 114 is moved toward the end 116 by the inner wire 119 of the coaxial cable 107 when the control lever 63B is moved toward the handle 63A, whereby the free end 118 is pulled toward the fixed end 116 against the force of a return spring 120.

Considering now the swivel connection 121 for mounting the driven wheel assembly 16 to the frame 14, the swivel connection 121 includes an upstanding tubular fork spindle or neck 123 (FIG. 6) extending in a substantially vertical direction in line with the vertical diameter of the wheel 18 from the cross member 66 and surrounding the cables 105 and 107, and a sleeve 125 having a pair of respective upper and lower opposed thrust bearings 127 and 129 to enable the spindle 151 to rotate freely within the sleeve 125. As shown in FIGS. 2, 3, 4, 5 and 6 of the drawings, four upstanding L-shaped frame portions 14A, 14B, 14C and 14D are fixed at their lower ends to a closed-loop bullet-shaped horizontal frame portion 14E and have their upper end portions fixed to the sleeve 145 to maintain it in its vertical position relative to the horizontal frame portion 14E. A nut 132 is tightened onto a threaded intermediate portion 134 of the spindle 123 against the thrust bearing 127 to retain the spindle 123 and the sleeve 125 in position. A fixed end portion 136 of the spindle 123 is fitted within a hole 138 of the cross member 66 of the fork 64 with an external annular shoulder 140 of the end portion 136 disposed against the cross member 66. An outer annular weld 142 secures the shoulder 140 to the cross member 66, and an inner annular weld 144 secures in a fixed manner the end portion 136 of the spindle 123 to the cross member 66. A dish-shaped gusset plate 146 (FIGS. 4, 5 and 6) has a hole 148 through which extends an intermediate portion of the sleeve 125 below the upstanding frame portions fixed thereto, the outer rim of the plate being fixed to the four upstanding frame portions. The portions of the frame 14 and the plate 146 are fixed together by any suitable technique such as welding. A reduced-diameter distal end portion 151 of the spindle 123 is fixed to the flexible coupling 43 to cause the spindle 123 and thus the driven wheel assembly 16 to rotate relative to the sleeve 125 and the frame 14 when the handlebar 49 and thus the steering column 47 are rotated about the axis of the steering column 47.

The flexible coupling 43 includes a reinforced high pressure flexible tubing 155, which may be purchased from Western Supply Co. of Casper, Wyoming, surrounds the distal end portion 151 of the spindle 123 and the cables 105 and 107, a clamp 157 securing one end of the tubing 155 to the end portion 151. A coil spring 157 is disposed within the tubing 155 surrounding the cables 105 and 107 to help prevent the tubing 155 from collapsing during use, and a clamp 161 secures the upper end portion of the tubing 155 to the lower end portion of the steering column 47 which fits within the tubing 155 as shown in FIGS. 4 and 5 of the drawings. As shown in FIGS. 2 and 4, a sleeve 163 surrounds and loosely receives an intermediate portion of the steering column 47 to guide it as it rotates and maintains it in its rearwardly and upwardly inclined position, opposed thrust bearings (not shown) may be positioned within the sleeve 163 to facilitate rotation of the steering column 47 in a manner similar to the thrust bearings 127 and 129 of FIG. 6 for the swivel connection 123. A support brace 165 is fixed between the sleeve 163 and the frame 14 to secure the sleeve 163 in position so that the steering column 47 may be rotated relative to the frame 14. The steering column 47 is rigid throughout its length and tubular in shape, the cables 105 and 107 extending through holes, such as the hole 167 for the cable 105 as shown in FIG. 4, in opposite sides of the steering column 47 so that the cables 105 and 107 rotate with the steering column 47, the flexible coupling 43 and the driven wheel assembly 16 with its upstanding spindle 123, whereby the driven assembly 16 may be rotated about a vertical axis extending through a vertical diameter of the wheel 18 and the axis of the swivel connection 121 without causing the cables 105 and 107 to become tangled.

Considering now in greater detail the control mechanism for the ramp 33 with reference to FIGS. 1, 2 and 3 of the drawings, a pair of rearwardly and downwardly sloping links 170 and 172 on opposite sides of the body portion 26 of the vehicle 10 connect and extend between the respective levers 52 and 54 and the opposite side edges of the ramp 33. A pair of ears 174 and 175 mounted on and fixed to the upper distal end portions of the respective levers 52 and 54 are connected pivotally to the upper end portions of the respective links 170 and 172, and similarly a pair of flanges 176 and 177 fixed to opposite side edges of the ramp 33 near the hinge 33A therefor are pivotally attached to the lower end portions of the respective links 170 and 172, whereby the ramp 33 moves in unison with the movement of the two levers 52 and 54 pivotally mounted on opposite sides of the vehicle 10 for controlling the raising and lowering of the ramp 33. A pair of latching dogs 178 and 179 pivotally connected to the respective levers 52 and 54 near the rod 56 each have a notch, such as the notch 181 of the latching dog 178, for latching or hooking onto a pair of pins 182 and 183 extending from the sides of the body 26 of the vehicle 10 to retain the levers 52 and 54 in their forward position to maintain the ramp 33 in its upper or closed position as shown in FIG. 2. A pair of links 184 and 185 connect the respective latching dogs 178 and 179 to a pair of hand operated levers 186 and 187, respectively, pivotally attached to the upper end portions of the respective levers 52 and 54 for pivoting the latching dogs about their pivot points in a clockwise direction as viewed in FIG. 2 out of engagement with their respective pins when the levers 186 and 187 are actuated to permit the ramp 33 to swing downwardly into its loading and unloading position as shown in FIG. 1. A pair of springs, such as the spring 188, are stretched between the latching dogs 178 and 179 and the respective levers 52 and 54 to bias the latching dogs into a position for engaging the pins for latching purposes.

For the purpose of braking the rear wheels 23 and 25 during the loading and unloading of the vehicle 10 when the ramp 33 is in its lower position as shown in FIGS. 1 and 3, a pair of brake arms 189 and 190 having respective brake pads 189A and 190A at the rear ends thereof are connected pivotally at their forward ends to the respective levers 52 and 54 near the rod 56 at the points of attachment for the springs, such as the spring 188, and are slidably mounted on opposite sides of the body 28 of the vehicle 10 to move in unison with the levers 52 and 54 in such a manner that the pads 189A and 190A move into braking engagement with their respective wheels 25 and 23 for braking purposes when the ramp 33 is disposed in its loading and unloading position as shown in FIGS. 1 and 3. When the levers 52 and 54 are unlatched and when they are pulled backwardly to pivot them about the rod 56, the brake arms 189 and 190 move rearwardly and extensively until they engage the treads of the respective wheels 25 and 23, at which point of movement of the levers 52 and 54, the outer edge 37 of the ramp 33 is resting on the supporting surface 39 as shown in FIG. 1. As a result, the weight of the ramp 33 as well as the weight of the wheel chair 12 or other objects moving along the ramp 33 up onto the floor 35 serve to maintain the pads 189A and 190A firmly in engagement with the treads of the tires 25 and 23 for braking purposes, since the levers 52 and 54 are restrained from pivoting in a counterclockwise direction as viewed in FIG. 1 due to the links 170 and 172 between the levers 52 and 54 and the ramp 33. It should be understood that if desired, only a single latching dog may be employed on one of the levers, instead of providing a latching arrangement for both levers.

Figure 8:
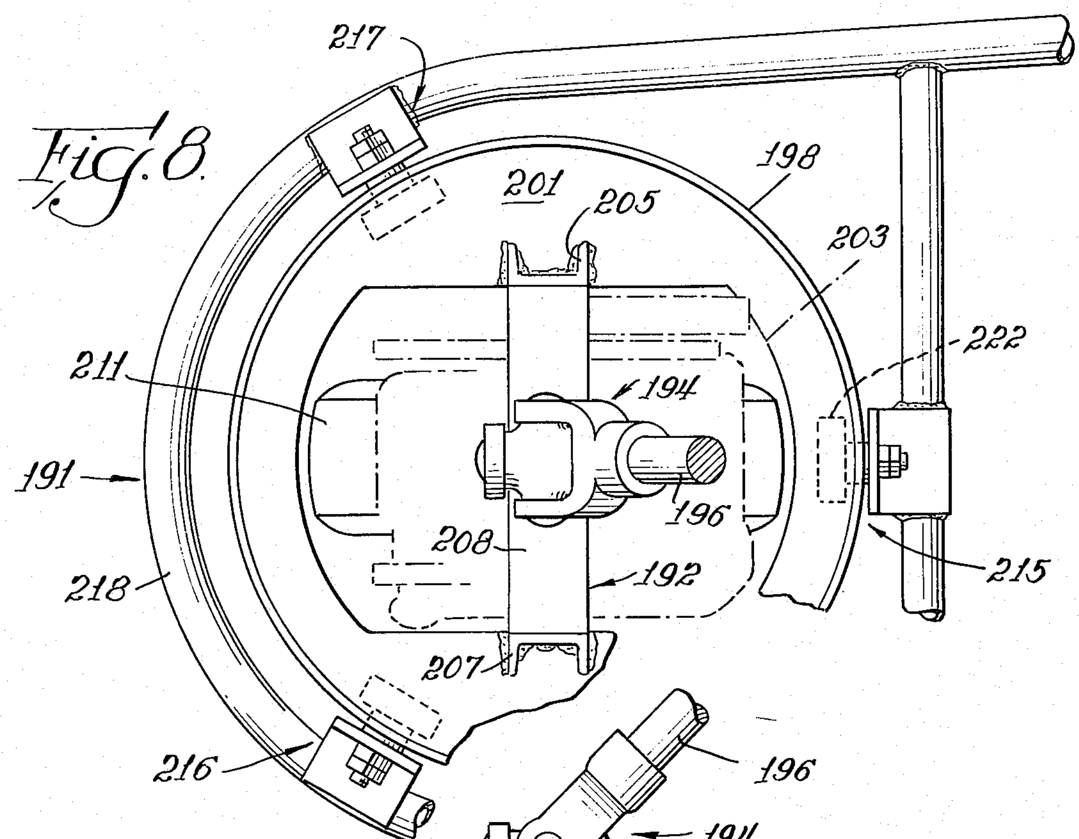
FIG. 8 is another flexible-coupling and swivel connection for a vehicle of the present invention in a fragmentary plan view thereof.
Figure 9:
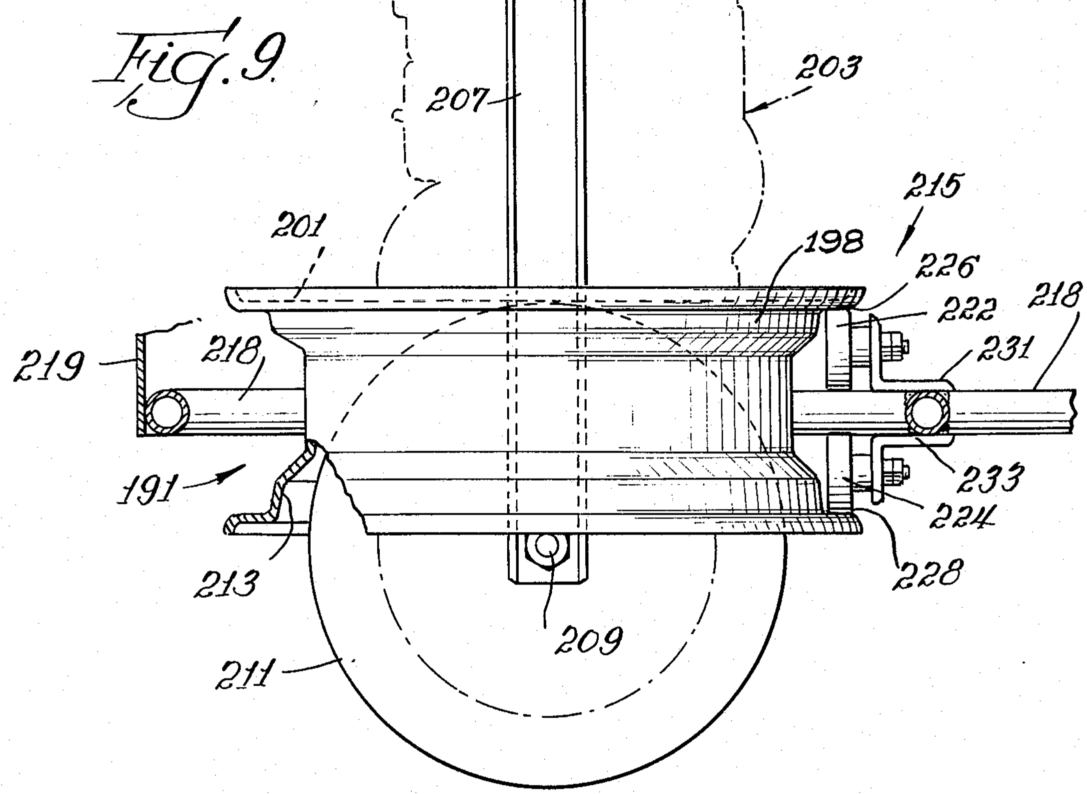
FIG. 9 is a fragmentary, cross-sectional elevational view of the flexible-coupling and swivel connection of a driven wheel assembly of FIG. 8.

Referring now to FIGS. 8 and 9 of the drawings, there is shown a driven front wheel assembly 191 for a vehicle of the present invention, and in this regard, the wheel assembly 191 of FIGS. 8 and 9 may be substituted for the corresponding driven wheel assembly 16 of the vehicle of FIGS. 1 through 7. The wheel assembly 191 is similar to the wheel assembly 16, except that the assembly 191 includes a rotatable turn table for supporting the wheel driving means. The assembly 191 generally comprises a fork 192 connected via a flexible coupling 194 to a steering column 196 and a cylindrical drum 198 having a platform 201 for carrying an engine 203 supported between the legs 205 and 207 depending from a cross member 208 of the fork 192, the legs 205 and 207 extending through openings in the platform 201 downwardly through the drum 198 and terminating in a position to support an axle between the legs 205 and 207 for rotatably supporting a driven wheel 211. A hollow interior 213 of the cup-shaped drum 198 partially receives the wheel 211, the drum having its open mouth facing downwardly, engine 203 being supported in the same manner as engine 41.

In order to mount the drum 198 in a manner to enable it to rotate about a vertical axis in a manner similar to the wheel assembly 16, three roller assemblies 215, 216 and 217 are fixed to a frame 218 for the body 219, and the roller assemblies are equally spaced about the periphery of the drum 198 to guide it as it rotates about a vertical axis under the control of the steering column 196. Each one of the roller assemblies is similar to one another, and therefore only the roller assembly 215 will now be described. The assembly 215 includes a pair of vertically aligned rollers 222 and 224 for engaging respectively the under side of the upper annular flange 226 of the drum 198 and the upper side of the lower annular flange 228. An upper L bracket 231 supports the roller 222 from the frame 218, and a lower L bracket 233 supports the roller 224 in rollable engagement with the flange 228.

The flexible coupling 194 is a U-joint universal connection to enable the steering column 196 to be inclined upwardly and rearwardly in a manner similar to the steering column 47 of the vehicle of FIG. 1.

It will be readily apparent to those skilled in the art that the present invention provides a novel and useful improvement in self-propelled vehicles of the character described herein. The arrangement and types of structural components utilized within the invention may be subject to numerous modifications well within the purview of this invention, and it is intended only to be limited to a liberal interpretation of the specification and appended claims.

What is claimed is:

1. In a self-propelled vehicle, the improvement comprising:

- a vehicle frame;
- front and rear wheel assemblies connected to said frame;
- a vehicle body mounted on said frame, said body for supporting and carrying the operator of the vehicle;
- drive means mounted on said frame having an output connected drivingly to a driven one of said wheel assemblies for powering the vehicle;

- driving and braking means for controlling the speed of said drive means and for braking purposes;
- mounting means disposed above and in alignment with the vertical axis of said driven wheel assembly and connecting rotatably the driven one of said wheel assemblies to said body for enabling said driven wheel assembly to rotate continuously uninterruptedly and freely about a vertical axis in a 360° circle of rotation; and
- manually operable steering control means rotatably mounted on the frame for rotating said driven wheel assembly about its axis in said 360° circle of rotation.

2. A self-propelled vehicle according to claim 1, wherein said driven assembly includes a wheel supporting fork and said moounting means includes connection means for rotatably mounting said fork to said frame.

3. A self-propelled vehicle according to claim 2, wherein said connection means includes a spindle fixedly mounted on and extending from said frame, a sleeve fixedly mounted on said frame for receiving swivally said spindle.

4. A self-propelled vehicle according to claim 3, wherein said spindle is tubular in shape and includes a hollow interior, said driving and braking means including a brake cable and a throttle cable extending from said steering control means axially through said spindle within the hollow interior thereof to said driving means.

5. A self-propelled vehicle according to claim 2, wherein said connection means includes a drum fixedly connected to said fork for supporting said drive means and roller means fixedly mounted on said frame for supporting rollably at least partially said drum to said frame to enable it to rotate about a vertical axis.

6. A self-propelled vehicle according to claim 2, wherein said mounting means includes a flexible coupling device, said fork including a substantially vertically extending spindle fixedly mounted on said fork, said steering control means including an inclined steering column rotatably mounted on said frame and extending upwardly and rearwardly, said steering column having a lower front end portion flexibly connected to said frame by means of said coupling device to enable the driver assembly to rotate about said vertical axis when said inclined steering column is rotated about its own inclined axis.

7. A self-propelled vehicle according to claim 1, wherein said driving and braking means includes a centrifugal clutch mechanism having a plurality of weights movable during operation of said power means, said clutch further includes a driven drum for rotating about its axis, a brake band at least partially surrounding said band and having a brake lining for moving into braking engagement with the outer surface of said drum while it is rotating for decreasing its speed to disengage the clutch.

8. In a self-propelled vehicle, the improvement comprising:

- a vehicle frame;
- front and rear wheel assemblies connected to said frame for rolling along a supporting surface;
- a vehicle body mounted on said frame, said body for supporting and carrying the operator of the vehicle;
- power means drivingly connected to at least one of said wheel assemblies for powering said vehicle;

steering control means for moving one of said wheel assemblies;

ramp means hingedly connected to said body to move between a loading and unloading position and a closed position over an opening in said body;

manually operable means for retaining releasably said ramp means in its closed position; and latching and braking means responsive to said manually operable means for preventing one of said wheel assemblies from rolling when said ramp means is in its loading and unloading position.

9. A self-propelled vehicle according to claim 8, wherein said manually operable means includes a control lever pivotally mounted on said frame and a link connecting said ramp means and said lever to cause them to move in unison, said braking means including an arm connected to said control lever for moving into braking engagement with one of said wheel assemblies when said ramp means is disposed in its loading and unloading position, a pin fixed to said body, a latching dog pivotally mounted on said lever for engaging releasably said pin when said ramp means is in its position to retain it in place, and spring means for urging resiliently said latching dog into engagement with said pin.

10. In a self-propelled vehicle, the improvement comprising:

a vehicle frame front and rear wheel assemblies connected to said frame;

a vehicle body mounted on said frame, said body for supporting and carrying the operator of the vehicle;

driving means mounted on said frame having an output connected drivingly to a driven one of said wheel assemblies for powering the vehicle, the driven one of said wheel assemblies to said body to permit said driven wheel assembly to rotate freely about an axis in a 360° circle of rotation;

driving and braking means for controlling the speed of sid drive means and for braking purposes;

manually operable steering control means rotatably mounted on the frame for rotating said driven wheel assembly about its axis in said 360° circle of rotation, said driven assembly including a wheel supporting fork and connection means for rotatably mounting said fork to said frame, said connection means including a spindle fixedly mounted on and extending from said frame, a sleeve being fixedly mounted on said frame for receiving swivally said spindle;

latching and braking means for retaining releasably said ramp means in its closed position and for braking one of said wheel assemblies to prevent the vehicle from moving when said ramp means is in its loading and unloading position.

11. A self-propelled vehicle according to claim 10, wherein said latching and braking means includes a manually operable control lever pivotally mounted on said frame, a link connecting said ramp means and said lever to cause them to move in unison, a brake arm connected to said control lever for moving into braking engagement with one of said wheel assemblies when said ramp means is disposed in its loading and unloading position, a pin fixed to said body, a latching dog pivotally mounted on said lever for engaging releasably said pin when said ramp means is in its closed position to retain it in place, and spring means for urging resiliently said latching dog into engagement with said pin.

12. In a self-propelled vehicle, the improvement comprising:

a vehicle frame;

front and rear wheel assemblies connected to said frame for rolling along a supporting surface;

a vehicle body mounted on said frame, said body for supporting and carrying the operator of the vehicle;

power means drivingly connected to at least one of said wheel assemblies for powering said vehicle;

steering control means for moving one of said wheel assemblies;

ramp means hingedly connected to said body to move between a loading and unloading position and a closed position over an opening in said body;

manually operable means for retaining releasably said ramp means in its closed position;

braking means responsive to said manually operable means for preventing one of said wheel assemblies from rolling when said ramp means is in its loading and unloading position, said manually operable means includes a control lever pivotally mounted on said frame and a link connecting said ramp means and said lever to cause them to move in unison, said braking means including an arm connected to said control lever for moving into braking engagement with one of said wheel assemblies when said ramp means is disposed in its loading and unloading position, a pin fixed to said body, a latching dog pivotally mounted on said lever for engaging releasably said pin when said ramp means is in its closed position to retain it in place, and spring means for urging resiliently said latching dog into engagement with said pin.

* * * * *